(12) United States Patent
Odom et al.

(10) Patent No.: US 6,936,812 B2
(45) Date of Patent: Aug. 30, 2005

(54) APPARATUS AND METHOD FOR DETERMINING DENSITY, POROSITY AND FLUID SATURATION OF FORMATIONS PENETRATED BY A BOREHOLE

(75) Inventors: Richard C. Odom, Benbrook, TX (US); Donald E. Tiller, Fort Worth, TX (US); Robert D. Wilson, Fort Worth, TX (US)

(73) Assignee: Preision Energy Services, Inc., Houston, TX (US)

( * ) Notice: Subject to any disclaimer, the term of this patent is extended or adjusted under 35 U.S.C. 154(b) by 0 days.

(21) Appl. No.: 10/852,443

(22) Filed: May 24, 2004

(65) Prior Publication Data

US 2004/0222368 A1 Nov. 11, 2004

Related U.S. Application Data (63) Continuation of application No. 10/104,449, filed on Mar. 19, 2002, now abandoned.

(51) Int. Cl.[7] .............................. G01V 5/10; G01V 5/08
(52) U.S. Cl. ................................ 250/269.5; 250/269.4; 250/269.1
(58) Field of Search .......................... 250/269.2, 269.3, 250/269.4, 269.5, 269.6, 269.7

(56) References Cited

U.S. PATENT DOCUMENTS 5,900,627 A * 5/1999 Odom et al. ............. 250/269.7

* cited by examiner

*Primary Examiner*—John R. Lee
*Assistant Examiner*—Paul M. Gurzo
(74) *Attorney, Agent, or Firm*—Patrick H McCollum

(57) ABSTRACT

A borehole logging system for determining bulk density, porosity and formation gas/liquid fluid saturation of formation penetrated by a borehole. Measures of fast neutron radiation and inelastic scatter gamma radiation, induced by a pulsed neutron source, are combined with an iterative numerical solution of a two-group diffusion model to obtain the formation parameters of interest. Double-valued ambiguities in prior art measurements are removed by using the iterative solution of the inverted two-group diffusion model. The system requires two gamma ray detectors at different axial spacings from the source, and a single neutron detector axially spaced between the two gamma ray detectors. The system can be embodied as a wireline system or as a logging-while-drilling system.

34 Claims, 6 Drawing Sheets

(PRIOR ART)

APPARATUS AND METHOD FOR DETERMINING DENSITY, POROSITY AND FLUID SATURATION OF FORMATIONS PENETRATED BY A BOREHOLE

This is a continuation of application Ser. No. 10/104,449 filed on Mar. 19, 2002 now abandoned.

BACKGROUND OF THE INVENTION

1. Field of the Invention

This invention is directed toward logging of earth formations penetrated by a borehole, and more particularly directed toward the determination of formation density, formation porosity and formation fluid saturation from measures of fast neutron and inelastic scatter gamma radiation induced by a pulsed source of fast neutrons. A two-group diffusion model is employed which defines a distributed source of gamma radiation within the formation resulting from fast neutrons impinging upon and inelastically scattering from nuclei within the formation. Ambiguities in prior art measurements are removed by using iterative solutions of the inverted two-group diffusion model.

2. Background of the Art

Density logging systems, which are compensated somewhat for the effects of the borehole, were introduced in the mid 1960s in the paper "The Physical Foundation of Formation Density Logging (Gamma-Gamma)", J. Tittman and J. S. Wahl, Geophysics, Vol. 30, p. 284, 1965. The system introduced by Tittman et. al., commonly referred to as a compensated gamma-gamma density logging system, was designed to operate in boreholes which are "open" and contain no steel casing. An instrument or "tool" is lowered into the well borehole on a cable, and the depth of the tool is determined by the amount of cable deployed at the surface of the earth. This type of tool contains an intense gamma-ray point source and preferably two gamma-ray detectors at differing distances from the source. The gamma ray detectors measure gamma rays that are scattered from electrons in the formation, and back into the borehole. Since for most earth formations, the electron density is in constant proportion to mass bulk density, the "backscatter" gamma ray intensity at the detectors provides a measure of formation bulk density. Two detectors at different axial spacings are preferably employed to allow the measurement to be compensated for the effect of mudcake that tends to accumulate on the borehole wall from drilling fluid used in the drilling process. The gamma-gamma density tool has a characteristic shallow depth of investigation into the formation of about 4 inches ("Depth of Investigation of Neutrons and Density Sondes for 35% Porosity Sand", H. Sherman and S. Locke, Proc. 16th Annu. SPWLA Symp., Paper Q, 1975) and therefore is heavily influenced by the near borehole environment. This tool cannot make quantitative density logs in boreholes that have been cased, where the casing is typically steel and is surrounded by a cement sheath.

One technique for measuring formation porosity utilizes a porosity sensitive tool known in the industry as a "neutron-neutron" porosity system (Dual-Spaced Neutron Logging for Porosity", L. Allen, C. Tittle, W. Mills and R. Caldwell, Geophysics Vol. 32, pp. 60–68, 1967). A two-group neutron diffusion model is used in developing the response of the logging system. The first group is an epithermal neutron group, and the second group is a thermal neutron group. The downhole tool portion of the system contains a source of fast neutrons, which is typically an isotopic source such as Americium—Beryllium (AmBe). At least two detectors sensitive to thermal or epithermal neutrons are axially spaced from the source at different distances. The detectors respond primarily to thermal or epithermal neutrons backscattered into the borehole by the formation. The measured backscatter flux is, in turn, primarily a function of the hydrogen content of the formation. If it is assumed that most hydrogen within the formation is contained in water or hydrocarbon in the pore space, the detectors respond to the porosity of the formation. As with the compensated density tool, the at least two neutron detectors respond to events at differing radial depths in the formation. The ratio of the detector response is formed to minimize the effects of reactions within the borehole, and porosity is determined from this ratio. The radial depth of investigation is about 9 or 10 inches, and the system can be calibrated to operate in both open and cased boreholes. It is again emphasized that this prior art methodology requires at least two detectors that are axially spaced from the neutron source.

U.S. Pat. No. 5,900,267 to Richard C. Odom et. al. discloses apparatus and methods for measuring the density of formations penetrated by a cased borehole. The borehole apparatus comprises a pulsed, fast neutron source and two axially spaced gamma ray detectors. The gamma ray detectors are biased to measure inelastic scatter gamma radiation produced by fast neutrons interacting with nuclei within the formation. Inelastic diffusion length $L_{RHO}$ is determined from the ratio of responses of the two detectors, and the measure of $L_{RHO}$ is subsequently related to formation bulk density. The physics of the $L_{RHO}$ bulk density logging technique is discussed in detail in the publication "Applications and Derivation of a New Cased Hole Density Porosity in Shaly Sand", Richard C. Odom et. al., Paper SPE 38699, Annu. Technical Conference and Exhibition, 1997. Although operable in cased boreholes where previously discussed gamma-gamma density systems are insensitive, the $L_{RHO}$ system yields ambiguous results in formations saturated with liquid and saturated with a gas/liquid fluid mixture.

Prior art techniques for determining gas saturation of formations penetrated by an open borehole involve the combination of the responses of the conventional gamma-gamma type density tool and porosity sensitive neutron-neutron tool. When the density and porosity tools are calibrated for the water-saturated pore space condition, and when they log formations that are water-saturated, they will produce values for formation bulk density and formation porosity that are consistent with each other, assuming the tools are logging in a rock matrix that is the same as that used for calibration. However, when a formation zone is encountered where the pore water is replaced by gas, the porosity tool gives an erroneously low porosity indication, while the density tool correctly indicates a decrease in bulk density with corresponding apparent increase in porosity. This results in a "cross-over" of the log response curves from the two tools thereby indicating the presence of gas within the logged formation. This method is problematic in cased boreholes because of the more shallow investigation depth of the density log and its resulting greater sensitivity to variations in borehole conditions, such as variations in the thickness of the cement sheath, immediately behind the casing.

Logging for gas in cased, cemented boreholes has been performed using a logging tool containing a pulsed source of fast neutrons. Details of this method may be found in "Examples of Dual Spacing Thermal Neutron Decay Time Logs in Texas Coast Oil and Gas Reservoirs", Trans. SPWLA 15th Annu. Logging Symp., 1979, and "The Use and Validation of Pulsed Neutron Surveys in Current Drilling Tests" Trans. SPWLA 19th Annu. Logging Symp., 1978. This "pulsed-neutron decay time" or "pulsed neutron" tool, as it is known in the art, was designed to detect the presence of hydrocarbon liquids (oil) in formations where the water that otherwise fills the pore spaces is normally saline. This sensitivity to fluid type is achieved by measuring the formation thermal neutron cross section. However, the cross section is not very sensitive to the presence of gas, and therefore the logging tool is not very useful as a gas indicator. Another type of measurement can be performed with the pulsed-neutron decay time tool that is more sensitive to the presence of gas. This involves measuring a ratio of the tool's typically two axially spaced gamma detector responses. This ratio can, in turn, be interpreted in a manner that is sensitive to the presence of gas within the logged formation. Since the measured gamma radiation is produced by thermal neutron capture reactions, this response is similar to that of the neutron-neutron porosity log in that both are responding to changes in the spatial distribution of thermal neutrons which, in turn, is a function of hydrogen density. For this reason, the gamma ratio response, like the neutron-neutron porosity tool response, is not capable of distinguishing between low porosity formations and formations with higher porosity whose pore spaces are gas filled. The density/gas saturation logging system set forth in this disclosure, on the other hand, responds to the change in atom density and hence can distinguish between the gas saturated high porosity and liquid saturated low porosity formations.

U.S. Pat. No. 5,804,820 to Michael L Evans et. al. discloses a density logging system that uses a source of fast neutrons, and a single gamma ray detector. A measure of fast neutron attenuation is required to obtain a meaningful density measurement from the response of the single gamma ray detector. A neutron detector is used to monitor source neutron attenuation. Alternately, it is taught that fast neutron attenuation can be inferred by making use of the fact that neutrons interacting with the various components of the tool result in the production of both inelastic and epithermal capture gamma rays. For example, fast neutrons interacting with the iron of the tool yield inelastic gamma radiation. A measure of intensity of this gamma radiation can be used to infer fast neutron attenuation. Gamma radiations from iron are quite prominent in the inelastic gamma-ray spectrum and as a result, are easy to use without complicated spectral deconvolution techniques. There is no teaching of methods to resolve ambiguities in density measurements for formations saturated with liquid and formations saturated with a significant fraction of gas.

U.S. Pat. No. 6,207,953 to Robert D. Wilson discloses a logging system that utilizes a source of fast neutrons. The system combines a measure of fast neutrons along with measures of inelastic gamma radiation at two axial spacings from the source to provide data used to compute formation porosity and liquid saturation. The computation is based on an interpretation chart that plots fast neutron count rate against an inelastic gamma ray ratio measured at the two axial spacings. Formation density can be computed from formation porosity if matrix and fluid densities are known. Inelastic diffusion length $L_{RHO}$ is a function of the measured ratio. A liquid scintillator is specified for fast neutron detection, providing both fast neutron and inelastic gamma counts by pulse-shape discrimination. An alternate plastic scintillator and gamma detector combination is also taught in the event that the liquid scintillator is not suitable for a particular application. Fast neutron energies are distinguished by use of pulse-height discrimination to provide borehole size compensation for air-filled boreholes. Although the system does minimize ambiguity in liquid and gas filled formations, there are still deficiencies in the methodology. The axial spacing of the neutron detector from the source is not optimized to minimize adverse borehole effects because of count rate statistics limitations. Inelastic scatter diffusion is determined from the ratio of inelastic scatter radiation at two axial spacings from the source. This methodology essentially assumes a point gamma radiation source, which physically is not robust as will be discussed in subsequent sections of this disclosure.

SUMMARY OF THE INVENTION

The invention set forth in this disclosure is embodied as a logging system to measure density, porosity and gas/liquid fluid saturation in earth formations penetrated by a cased or open borehole. The gas/liquid fluid saturation is typically expressed as the portion ($S_W$) of the total fluid that is liquid, or alternately as the portion ($S_G$) of the total fluid that is gas, where $S_G=(1-S_W)$. The system is designed to minimize, or even eliminate, adverse response properties in prior art logging systems discussed previously. Although the invention is directed toward measuring various properties of earth formations penetrated by a borehole, it should be understood that the disclosed apparatus and methods can be used to measure properties of other types of material such as construction materials, road bed materials, ground surface composition, and the like.

Embodied as a logging system, the well borehole instrumentation consists of an elongated, pressure housed downhole instrument or "tool" preferably containing an electronic source of high energy or "fast" neutrons, commonly referred to as a neutron generator. Fast neutrons are emitted in sequential bursts or "pulses". The tool also contains preferably three axially spaced radiation detectors that measure the intensity and energy of radiations produced by various reactions of fast neutrons with formation nuclei and electrons. The preferred embodiment comprises a single neutron detector and two gamma ray detectors.

The methodology consists of acquiring count rates from the preferred three detectors, individually and in combination, as the apparatus is raised or lowered inside a borehole. More specifically, the intensities of fast neutron and inelastic scatter gamma radiations are measured at their respective detector axial spacings. Measurements are made during the neutron pulses, and preferably made during the same neutron pulses. Basic physics studies have led to a better understanding of the relationships between measured quantities and the formation parameters of interest. These studies have established important nuclear parameters along with their relationship to the desired formation properties of density, porosity, and fluid saturation. A model based on two-group diffusion theory has been successfully inverted to provide a means for determining formation density, fluid saturation and porosity from two measurements of inelastic gamma radiation and a single measure of fast neutron radiation.

Prior to summarizing features of the model and the data processing methodology, a brief discussion of concepts underlying the measurements is appropriate. At least one of the measured count rates is proportional to fast neutron flux present during the sequential neutron bursts from the pulsed source of fast neutrons. At least one additional measured count rate is proportional to prompt gamma radiation due to the inelastic scattering of fast neutrons off of formation and borehole nuclei during each neutron burst. Both of these measurements derive from nuclear interaction processes of neutrons in the million electron volt (MeV) range with the nuclei and electrons of atoms comprising the earth formation and surrounding borehole environs. Both of these measurements are made during the neutron burst. The fast neutron measurement responds primarily to changes in hydrogenous liquid (water or oil) saturation of the earth formation pore space, although it also responds to changes in bulk density of the formation. The inelastic gamma measurement responds primarily to changes in formation bulk density, though it is also somewhat sensitive to the liquid content of the formation. By combining measured fast neutron and prompt gamma ray count rates, density, porosity, and fluid saturation of the formation can be obtained if the lithology of the formation is known.

It is important to again emphasize that neutron and gamma ray measurements respond not only to properties of the formation penetrated by the borehole, but they also respond to properties of the borehole region. Prior art systems have used ratios of responses of at least two detectors, at different axial spacings and with different radial depths of investigation, to minimize or "cancel" borehole effects. As an example, responses of two neutron detectors at two differing spacings are used in prior art systems to determine formation porosity. If the spacings are too great, then the measured count rate can be statistically insignificant. If the spacings are two small, then the radial depths of investigation of the detectors are small thereby rendering detector responses relatively insensitive to formation properties. If the separation between the two detectors is too small, then count rates vary little between the two detectors and variations in the count rate ratio used to compute porosity can be statistically insignificant. It is, therefore, often difficult to select two axial detector spacings that meet the above count rate, depth of investigation, and count rate differential criteria.

Attention is next directed toward the model that has been developed to process measured data. It is first noted that measured gamma radiation is generated within the borehole environs by fast neutron reactions. The gamma ray source is therefore dispersed rather than a point source assumed in many prior art systems. The model takes into account the dispersed nature of the inelastic gamma source, and is based on two-group diffusion theory. Group one describes the fast neutron transport from the logging tool into the borehole environs, and group two describes the inelastic gamma radiation transport within the borehole environs wherein a portion reaches the gamma ray detectors in the logging tool. The diffusion solution for the fast neutron group one becomes the source of inelastic scatter gamma radiation for group two. The diffusion length $L_{FN}$ characterizes the spatial distribution of fast neutrons. The diffusion solution for the inelastic gamma group describes the inelastic scatter gamma ray distribution, and contains terms dependent on the fast neutron diffusion length $L_{FN}$ and an inelastic scatter gamma ray diffusion length $L_{IG}$. The solutions are analogous to the two-group neutron solutions developed in the previously referenced paper by Allen et. al. The solutions are for a uniform medium and with spherical geometry. In principle, $L_{FN}$ is computed from the model using fast neutron count rates measured at two or more suitable spacings from the neutron source. These count rates are proportional to the fast neutron flux. The inelastic gamma radiation flux is obtained from a convolution integral for a spherically symmetric source distribution. $L_{IG}$ is determined using $L_{FN}$ and inelastic scatter gamma radiation count rates measured at two different axial spacings from the neutron source. An iterative method using trial values of $L_{IG}$ quickly produces a solution in the form of an "linearized" diffusion length value, $L_{IG,l}$. The iterative solution eliminates previously discussed ambiguities in liquid and gas saturated formations by producing a unique $L_{IG,l}$ for each formation bulk density value.

The two-group diffusion model for the coupled fast neutron and inelastic gamma transport problem is one-dimensional and homogeneous. It does not, therefore, specifically account for a finite borehole region including the borehole, casing and cement annulus. In reality, fast neutron and inelastic gamma radiation fluxes close to the source are dominated by transport in the borehole region. Monte Carlo simulations show that spacings of 40 cm or greater are required before the fast neutron flux has substantial formation sensitivity. Therefore, in order to obtain a fast neutron diffusion length $L_{FN}$ related to the formation, measurements should be made at spacings greater than about 40 centimeters (cm). In practice, it is difficult to achieve adequate fast neutron count rate at axial spacings greater than about 60 cm. The logging tool uses a single fast neutron detector axially spaced at about 55 cm from the neutron source. Although this detector has good formation sensitivity, the single count rate alone cannot directly yield a value of $L_{FN}$. This single fast neutron count rate is related to the proper $L_{FN}$ value for use in the iterative solution within the structure of the model. This is accomplished by use of Monte Carlo simulations in combination with the equations of the two-group diffusion model. The $L_{FN}$ values corresponding to each fast neutron response are determined by deriving a set of values that are self consistent, smoothly related to fast neutron response, and that produce identical values of inelastic gamma radiation diffusion length $L_{IG}$ for a common bulk density $\rho_b$ computed from the model. The ratio of inelastic scatter gamma ray count rates measured with two axially spaced detectors is used in the computation of $L_{IG}$. The resulting $L_{IG}$ values exhibit the required inverse proportionality to bulk density $\rho_b$, which is one of the parameters of interest. Fast neutron count rate is then combined with the ratio of inelastic scatter gamma radiation and a parameter proportional to the inverse of $\rho_b$ to determine formation porosity and formation fluid saturation.

The present invention exhibits many advantages over prior art systems. Ambiguities in measurements in liquid and gas saturated formations are eliminated. The two-group diffusion model used as a basis for data analysis includes a distributed source of gamma radiation, which physically more closely represents the gamma ray measurements rather than a point source gamma ray source. Fast neutron diffusion length is measured with a single neutron detector, which is axially spaced a relatively large distance from the neutron source thereby minimizing adverse effects of the near borehole region, yet responding with statistically significant count rates for a given neutron source strength. Formation density, formation porosity, and formation fluid saturation are uniquely determined. The measurement can be made in both open and cased boreholes. The system can be embodied in a variety of borehole systems including a wireline logging system, a logging while drilling system, a coiled tubing logging system, and a slickline logging system. The neutron generator can be disabled when the tool is removed from the borehole thereby reducing the risk of radiation exposure to personnel and property. Other advantages will become apparent in the following detailed description of the preferred embodiments of the invention.

BRIEF DESCRIPTION OF THE DRAWINGS

So that the manner in which the above recited features, advantages and objects of the present invention are attained

DETAILED DESCRIPTION OF THE PREFERRED EMBODIMENTS

The invention set forth in this disclosure is embodied as a logging system to measure density, porosity and gas/liquid fluid saturation in earth formations penetrated by a cased or open borehole. As mentioned previously, gas/liquid fluid saturation is typically expressed as liquid saturation $S_W$, or alternately as gas saturation $S_G$, where $S_G=(1-S_W)$. Prior to disclosing features of the model and the data processing methodology, a brief discussion of concepts underlying the measurements are appropriate.

3. Basic Concepts of the System

At least one of the measured count rates is proportional to fast neutron flux present during the sequential neutron bursts. Another measured count rate is proportional to prompt gamma radiation due to the inelastic scattering of fast neutrons off of formation and borehole nuclei during each neutron burst. Both of these measurements derive from nuclear interaction processes of neutrons in the MeV range with the nuclei and electrons of atoms comprising the earth formation and surrounding borehole environs. One measurement is of the high energy (3 to 10 MeV) neutrons which are transported back into the borehole and arrive at a fast neutron detector suitably axially spaced from a pulsed neutron source emitting typically 14 MeV neutrons. A second measurement is of the high energy (0.1 to 10 MeV) inelastic scatter gamma radiation, which is produced promptly during the source neutron pulse, and which is transported back into the borehole and subsequently measured at preferably two axially spaced gamma ray detectors. Neutron measurements and gamma ray measurements are made during the neutron source pulse, and preferably made during the each of same sequence of pulses.

The fast neutron measurement responds primarily to changes in liquid or gas saturation of the earth formation pore space, although it also responds to a lesser extent to changes in bulk density of the formation. The inelastic gamma radiation measurement responds primarily to changes in formation bulk density, although it is also somewhat sensitive to the fluid content of the formation. By combining measured fast neutron and the prompt inelastic scatter gamma ray count rates, bulk density, gas/liquid fluid saturation and porosity of the formation can be obtained if the lithology of the formation is known.

4. Apparatus

Figure 1:
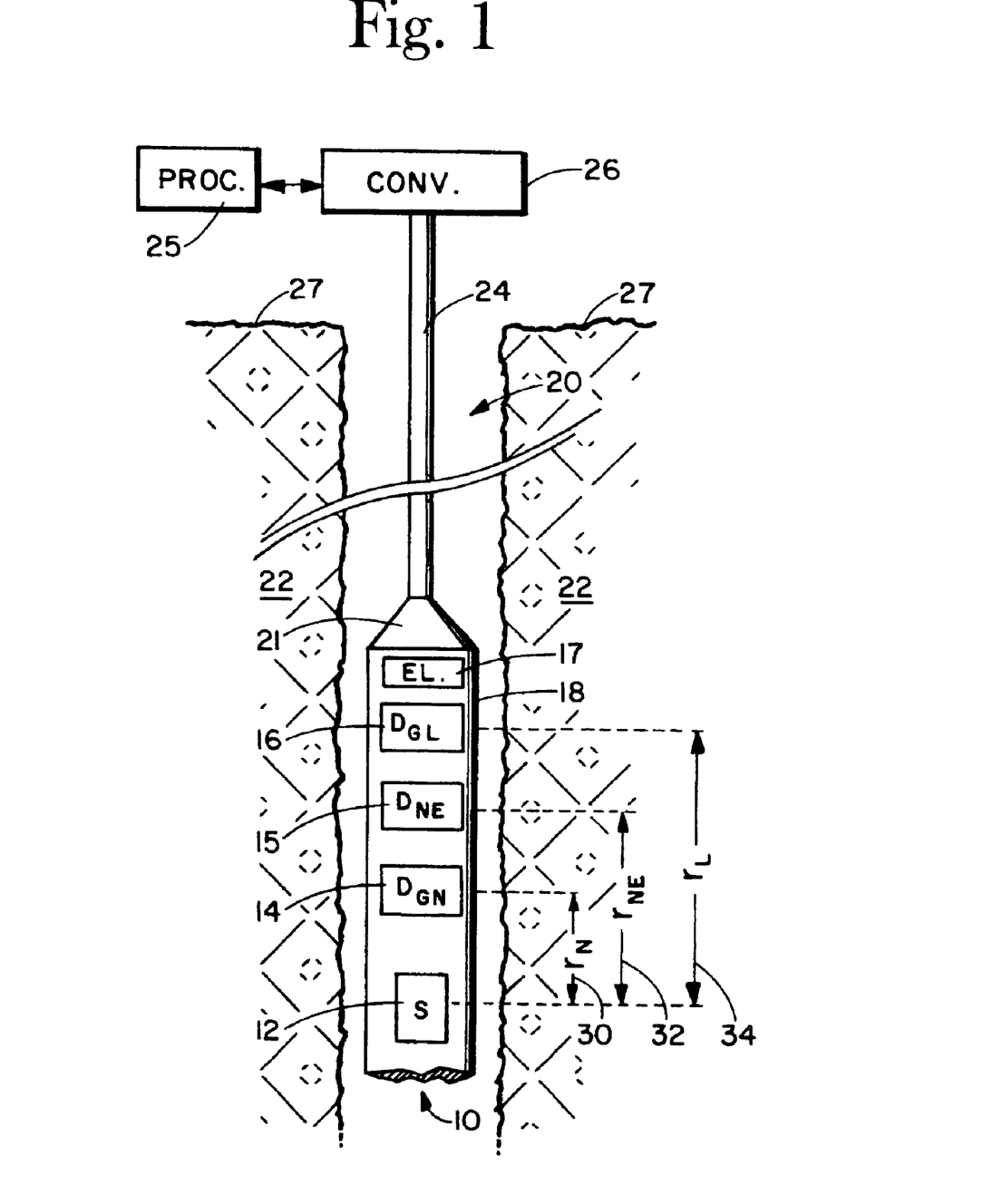
FIG. 1 illustrates an instrument suspended in a borehole and conveyable along the borehole by a conveyance means at the surface of the earth.

FIG. 1 illustrates a logging tool 10 comprising a radiation source 12 which is preferably a neutron generator producing pulses of neutrons at energy of about 14 MeV. The pulsed neutron generator consists of a high energy neutron producing target with associated gas reservoir and accelerated ion beam, high voltage supplies and pulsing electronics, as is well known in the art. The logging tool 10 also comprises a neutron detector 15 axially spaced a distance $r_{NE}$ from the source 12 as indicated at 32. The logging tool 10 further comprises a near gamma ray detector 14 and a long spaced gamma ray detector 16 axially spaced distanced $r_N$ and $r_L$, respectively from the neutron source 12. The distances $r_N$ and $r_L$ are denoted by the numerals 30 and 34, respectively. An electronics package 17 provides power and control for the other previously described elements of the logging tool 10. The electronics package can also contain data processing equipment, such as circuits to determine the intensity and energy of radiation impinging upon the radiation detectors 14, 15 and 16. Optionally, the electronics package 17 also contains a processor to transform measured radiation energy and intensity into parameters of interest. Alternately, a processor 25 can be located at the surface of the earth 27 wherein the processor cooperates with the logging tool 10 through a conveyance unit 26.

Still referring to FIG. 1, elements of the logging tool 10 are enclosed within a pressure housing 18 for protection from the harsh environment of the borehole 20. The tool 10 is conveyed along a borehole 20 penetrating an earth formation 22 by a conveyance system that includes a member 24 with a first end operationally connected to the tool 10 using a suitable connector 21. The member 24 extends to the surface of the earth 27 and has a second end operationally connected the surface conveyance unit 26. If the conveyance system is a wireline logging system, the member 24 is a wireline logging cable, and the surface conveyance unit 26 comprises wireline draw works and surface equipment well known in the art. If the conveyance system is a drilling rig, the member 24 is a drill pipe string and the surface conveyance 26 comprises a drilling rig, which is also well known in the art. Other conveyance systems, including a coiled tubing system and a slickline system, can be used to convey the tool 10 along the borehole 20. The surface conveyance unit 26 can also contain data processing equipment, such as circuits to determine the intensity and energy of radiation impinging upon and interacting with the radiation detectors 14, 15 and 16. The surface conveyance unit 26 can further contain a processor to transform measured radiation energy and intensity into parameters of interest.

5. System Response Model

The model used to develop data processing methodology is based on two-group diffusion theory. Group one describes the fast neutron transport and group two describes the inelastic gamma transport. The model accounts for the previously discussed dispersed nature of the inelastic gamma source. The model is represented mathematically by the following equations:

$$\Phi_{FN}=Q/(4\pi D_{FN})(1/r)(\exp(-r/L_{FN})) \text{ and} \quad (1)$$

$$\Phi_{IG}=(QL_{IG}^2/(4\pi D_{IG}(L_{FN}^2-L_{IG}^2))(1/r)(\exp(-r/L_{FN})-\exp(-r/L_{IG})). \quad (2)$$

where $\Phi_{FN}$=the fast neutron flux at spatial position r;

$\Phi_{IG}$=the inelastic scatter gamma ray flux at spatial position r;

$D_{FN}$=the diffusion coefficient for fast neutrons;

$D_{IG}$=the diffusion coefficient for inelastic scattered gamma rays; and

Q=the strength of the fast neutron source.

The respective diffusion coefficients, $D_i$, are related to diffusion length $L_i$ by:

$$L_i^2 = D_i / \Sigma_{r,i}$$

where i=FN, IG; and $\Sigma_{r,i}$=the probability per cm for removal from the respective energy group.

Equation (1) is the diffusion solution for the fast neutron group. Equation (1) describes the fast neutron distribution, and becomes the source term of dispersed inelastic gamma radiation for group two. The diffusion length $L_{FN}$ characterizes the spatial distribution of fast neutrons. Equation (2) is the diffusion solution for the inelastic gamma group with a source term given by equation (1). It describes the inelastic gamma distribution and contains terms dependent on the fast neutron diffusion length $L_{FN}$ and inelastic gamma diffusion length $L_{IG}$. The solutions are analogous to the previously referenced two-group neutron model developed by Allen et. al. These solutions are for a uniform medium and with spherical geometry.

For the fast neutron group, $\Sigma_{r,FN}$ is the probability per cm for a neutron to be removed from the energy range of about 3 MeV to 14 MeV. For the inelastic gamma group, $\Sigma_{r,IG}$ is the probability per cm for an inelastic gamma to be removed from the 100 kiloelectron volts (keV) to 10 MeV energy range.

In the prior art, $L_{FN}$ is typically computed from equation (1) using a combination of fast neutron count rates measured at two or more suitable spacings from the source. These count rates are proportional to the fast neutron flux. This combination process eliminates some terms from equation (1) which are not measurable and are not generally known. The process, however, requires two or more axially spaced fast neutron detector systems which (a) adds complexity to the downhole logging equipment, and (b) creates depth of investigation and count rate statistics problems discussed previously.

Equation (2) for the inelastic gamma flux is derived from the convolution integral for a spherically symmetric source distribution:

$$\Phi_{IG} = \int_0^\infty S(r') G_{SS}(r, r') 4\pi r'^2 \, dr' \quad (3)$$

where the diffusion kernel $G_{ss}(r,r')$ is given by the equation $$G_{ss}(r,r') = (L_{IG}/4\pi D_{IG})(1/rr')\{\exp(-|r-r'|/L_{IG}) - \exp(-|r+r'|/L_{IG})\}. \quad (4)$$

at spatial positions r and r'. The spherically symmetric source distribution S(r') is given by the fast neutron distribution of equation (1).

$L_{IG}$ is computed from equation (2) using $L_{FN}$ as computed from equation (1) and inelastic gamma count rates measured at spacings $r_N$ and $r_L$ (see FIG. 1). Preferably, $r_N$ is about 35 cm and $r_L$ is about 95 cm. Again, the inelastic count rates at $r_N$=35 cm and $r_L$=95 cm are proportional to the corresponding fluxes $\Phi_{IG}$ in equation (2). The constant coefficients in equation (2) cancel if a flux ratio is formed for the two spacings:

$$(r_N/r_L)(\Phi_{IG}(r_N)/\Phi_{IG}(r_L)) = (\exp(-r_N/L_{FN}) - \exp(-r_N/L_{IG}))/(\exp(-r_L/L_{FN}) - \exp(-r_L/L_{IG})). \quad (5)$$

The resulting expression cannot be solved directly for $L_{IG}$, but an iterative method using trial values of $L_{IG}$ quickly produces a solution. The iterated value of $L_{IG}$ is free of the ambiguity inherent in certain prior art double-valued solutions discussed previously. More specifically, if a point source model is used to compute inelastic scatter gamma ray diffusion length, ambiguous double-valued results are obtained for constant density pairs, depending upon whether the formation is liquid or gas saturated. This is because of differing fast neutron diffusion lengths resulting from differences in the two saturating fluids. Examples of double-valued results obtained with prior art, point source models will be presented in a subsequent section of this disclosure. Inelastic gamma ray diffusion lengths computed from the point source model will be designated as "$L_{RHO}$" to distinguish this parameter from inelastic gamma ray diffusion length $L_{IG}$ computed using the two-group distributed source model. The iterative solution of equation (5) eliminates this ambiguity, producing a unique $L_{IG}$ for each density. It should be noted that equation (5) will produce indeterminate results for the case where $L_{FN}$ and $L_{IG}$ are the same. However, in practice, $L_{FN}$ is usually smaller than $L_{IG}$ so this difficulty is avoided. For gas saturated porosity, $L_{FN}$ and $L_{IG}$ can have similar values. For the case of equal or near-equal values, another form of the two-group solution would be used to avoid the indeterminacy of equation (5).

6. System Response

Count rate data used in the following discussions are in arbitrary units. The fast neutron count rate $C_{FN}$ is for a spacing $r_{NE}$=50 cm. The inelastic scatter gamma ray count rates $C_{GN}$ and $C_{GL}$ are measured at gamma ray detector spacings $r_N$=30 cm and $r_L$=90 cm, respectively. The formation matrix is sandstone unless otherwise noted. Count rate data used to develop interpretation models are computed with the Monte Carlo simulation method using the MCNP code. Other suitable numerical simulation and transport computation models can be used to obtain the required count rates.

Figure 2:
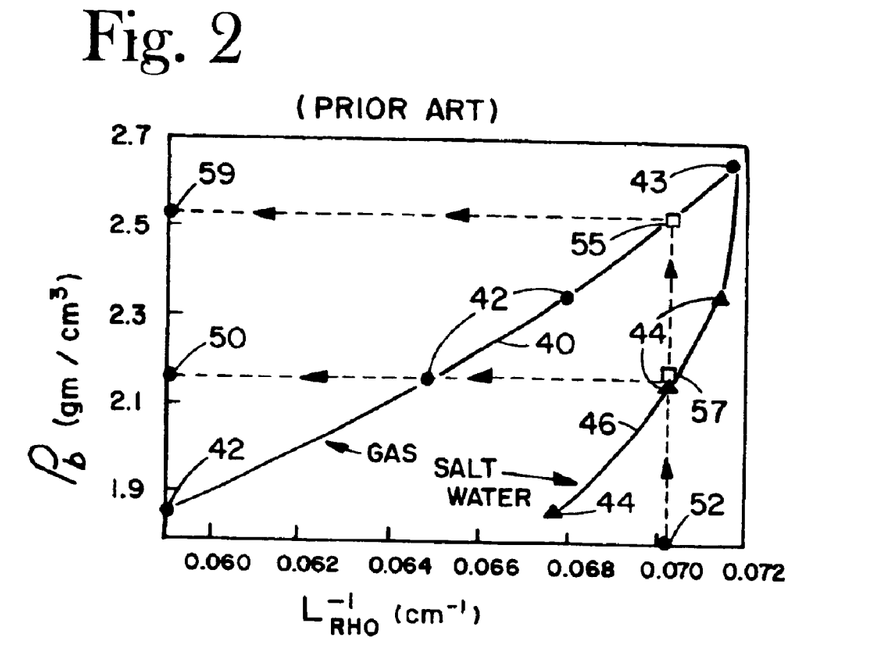
FIG. 2 illustrates formation bulk density plotted as a function of the inverse of inelastic scatter gamma radiation diffusion length illustrating double-valued results obtained with prior art point source models.

FIG. 2 illustrates double-valued results in $\rho_b$ obtained from the inelastic scatter gamma ray diffusion length $L_{RHO}$ computed from the prior art point source model using a ratio of inelastic scattered gamma radiation $C_{GN}/C_{GL}$ measured at $r_N$ and $r_L$. Recall that $C_{GN}/C_{GL}$ is proportional to $\Phi_{IG}(r_N)/\Phi_{IG}(r_L)$ as defined above. Formation bulk density $\rho_b$ is plotted as a function of the inverse of $L_{RHO}$ for sandstone formations ranging in density from 1.86 gm/cm$^3$ to 2.65 gm/cm$^3$. The points 42 represent gas saturated formations with a gas density of 0.00 gm/cm$^3$. A smooth curve 40 has been fitted to the data points 42 and the point 43. The points 44 represent salt water saturated formations with a liquid density of 1.07 gm/cm$^3$. A smooth curve 46 has been fitted to the data points 44 and the point 43. The curves 40 and 46 converge at the point 43, which represents a sandstone formation with zero porosity or 0.0 porosity units (p.u.). The ambiguity in $\rho_b$ can be clearly illustrated by example. Assume that $L_{RHO}$ is determined to be 14.25 cm, or $1/L_{RHO}$= 0.0701 cm$^{-1}$ as illustrated by point 52. A line projected vertically from the point 52 intersects the curve 46 at a point 57, and intersects the curve 40 at a point 55. Lines projected horizontally from the intersection points 57 and 55 yield values of $\rho_b$ of 2.16 gm/cm3 (point 50) and 2.53 gm/cm3 (point 59), respectively. Two ambiguous values of $\rho_b$ are, therefore, obtained for the same value of $L_{RHO}$ depending upon the fluid saturating the formation matrix.

It should be noted that the two-group diffusion model for the coupled fast neutron and inelastic gamma transport problem is one-dimensional and homogeneous. It does not include the cylindrical arrangement of the various material in the near borehole environs such as the borehole and fluid therein, casing, and cement sheath filling the casing-formation annulus. The model does not account for the logging tool being eccentered within the casing. Fast neutron and inelastic scatter gamma ray fluxes close to the source are dominated by transport within the near-borehole region. Monte Carlo simulations show that spacings of $r_{NE}=40$ cm or greater are required before the fast neutron flux has substantial formation sensitivity. Therefore, in order to infer a formation related $L_{FN}$ from equation (1), measurements should be made at spacings greater than about 40 cm. In practice, it is difficult to achieve adequate fast neutron count rate at spacings greater than about 60 cm due to statistical limitations. Because of the above factors, the value of $r_{NE}$ in the logging tool 10 (see FIG. 1) is selected to be about 50 cm. Again because of the above factors, it is not practical to use two axially spaced neutron detectors to obtain an indication of fast neutron diffusion length. If a second detector were spaced closer to the neutron source, formation sensitivity in this detector would be significantly degraded. If a second detector were axially spaced further from the neutron source, the measurement would be significantly degraded by poor counting statistics. Although the axial spacing $r_{NE}$ of the single neutron detector 15 in the tool 10 (see FIG. 1) has good formation sensitivity, a single count rate alone measured with this detector cannot produce a value of $L_{FN}$ from equation (1). However, for constant neutron source strength, it is possible to relate the single fast neutron count rate $C_{FN}$ to the proper $L_{FN}$ value for use in the iterative solution of equation (5). This is accomplished by use of Monte Carlo simulations in combination with the equations of the two-group diffusion model. The process is illustrated by the following examples.

The analysis using the two-group diffusion model of the present invention will be illustrated again using examples of sandstone formations at several bulk densities $\rho_b$. At each density there are again two formations with one having gas saturated porosity and another having salt water saturated porosity. The porosities are different for each pair in order to maintain constant density. The count rates $C_{FN}$, $C_{G,N}$ and $C_{G,L}$ are then input to the two-group diffusion analysis model. The $L_{FN}$ values corresponding to each fast neutron response are determined by deriving a set of values that are self-consistent, smoothly related to fast neutron response, and that produce identical values of inelastic gamma ray diffusion length $L_{IG}$ for a common bulk density $\rho_b$ when used to solve equation (5). The resulting $L_{IG}$ values are constrained in that they must exhibit the required inverse proportionality to bulk density $\rho_b$. As a starting point in this procedure, $L_{FN}$ values are computed by using equation (1) to analyze curves of fast neutron flux $\Phi_{FN}$ versus spacing that are simulated for each formation by MCNP. When the resulting values of $L_{FN}$ are inserted into equation (5), it is apparent that these do not represent a consistent set of values meeting the constraint that resulting $L_{IG}$ values must exhibit the required inverse proportionality to bulk density $\rho_b$. Further, the values of $L_{FN}$ do not exhibit a smooth relation to fast neutron response $C_{FN}$ computed for $r_{NE}=50$ cm. In addition, resulting $L_{IG}$ values are smaller than expected and not unique for a common bulk density $\rho_b$.

As a first step toward improving the results obtained from equation (5) for the range of formations under investigation, the $L_{FN}$ values computed from equation (1) for liquid and gas saturated formations are adjusted. This process of adjusting $L_{FN}$ is best described as a process of linearizing the relation between $\Phi_{FN}$ and $L_{FN}$ in such a way that a smooth curve can be fitted to the result. The values of $L_{FN}$ computed from $\Phi_{FN}$ and the fit coefficients, when used with the inelastic gamma ratio in equation (5), produce good solutions which have no ambiguity and which show inverse relation to bulk density $\rho_b$. The resulting linearized value, defined as $L_{FN,Li}$, is expressed mathematically as $$L_{FN,Li}=L_{FN}+D_i \qquad (6)$$

where $D_i$ is an adjustable parameter and i denotes liquid (i=L) or gas (i=G) formation saturation. Differences between $L_{FN}$ values for 100 percent liquid saturated (SW=1.00) formations are small. As an example, the MCNP derived values of $L_{FN}$ are 10.96, 10.95, and 10.9 cm for the three saturated formations of porosity 18, 30, and 50 p.u., respectively. These values of $L_{FN}$ were initially decreased by $D_L=-1.0$ cm, which is a substantial percentage adjustment. Smaller adjustments in the value of $D_L$ were then made to give the values of $L_{FN,Li}=9.9$ cm, 9.7 cm and 9.5 cm, respectively, which show the desired linear trend with $\Phi_{FN}$. Then, for each formation with a given bulk density and liquid saturated pore space (i=L), the companion gas saturated porosity case is evaluated for $L_{FN,Li}$ (i=G) using equation (5), where $D_G$ is iterated until $L_{IG,G}$, the inelastic gamma ray diffusion length for gas satutated formations, agrees with $L_{IG,L}$, the inelastic gamma ray diffusion length for liquid saturated formation value at that density.

Figure 3:
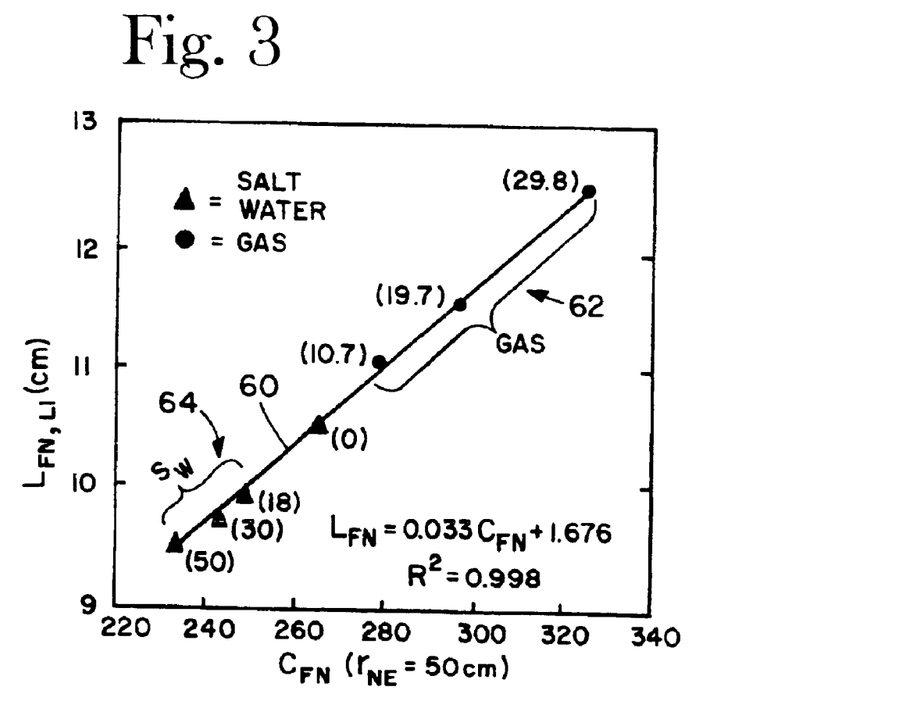
FIG. 3 illustrates linearized fast neutron diffusion length plotted as a function of measured fast neutron count rate.

$L_{FN,Li}$ values obtained by the above procedure, plotted as a function of $C_{FN}$ at $r_{NE}=50$ cm, are shown in FIG. 3. Data points 62 for gas (density=0.0 gm/cm$^3$) saturated formations are denoted by circles, and data points 64 for liquid (salt water of density 1.07 gm/cm$^3$) saturated formations are denoted by triangles. Numbers shown in parenthesis denote formation porosity in p.u. The curve 60, fitted to all data points, exhibits the desired linear trend and is expressed by the relationship $$L_{NF,Li}=0.033C_{FN}+1.676 \qquad (7)$$

with a fit correlation of $R^2=0.998$. Equation (7) represents a linearized relationship that is independent of fluid saturation, fluid type and pore space volume of the formation. When used in equation (5), this set of $L_{FN,Li}$ values produces a set of $L_{IG,l}$ values by the iterative solution.

Figure 4:
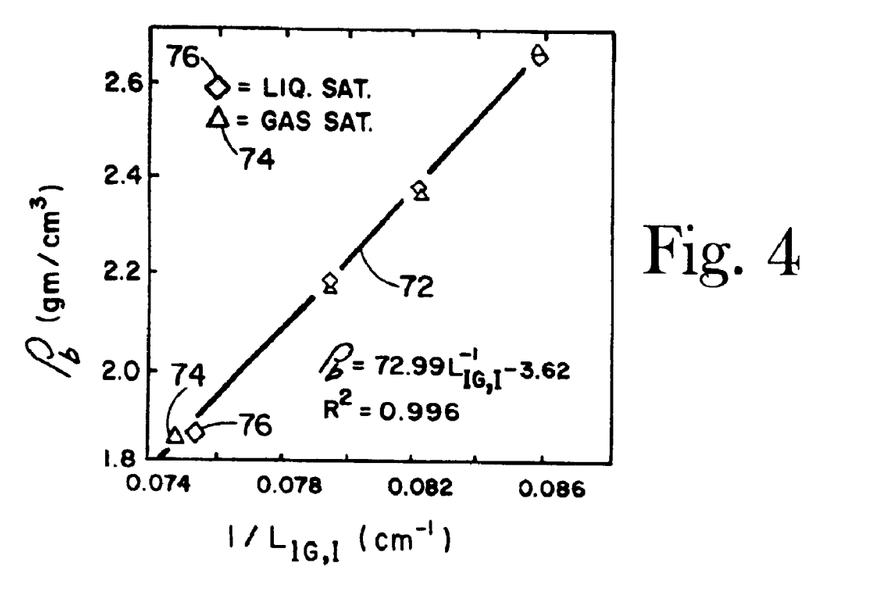
FIG. 4 illustrates formation bulk density plotted as a function of the inverse of linearized inelastic scatter gamma ray diffusion length.

FIG. 4 is a plot of $1/L_{IG,l}$ versus bulk density $\rho_b$. Separate symbols are used for the salt-water saturated porosity and the gas saturated porosity cases to show the nature of the agreement and resulting minimization of the $L_{RHO}$ ambiguity shown in FIG. 2. Specifically, the diamond points 76 indicate salt water saturated formations, and the triangle points 74 indicate gas saturated formations. A curve 72 is shown fitted through all data points 74 and 76, although there is a very small separation in the curves at low values of $1/L_{IG,l}$ as indicated by the data points 74 and 76. The curve 72 is expressed mathematically as a first order polynomial $$\rho_b=72.99(1/L_{IG,l})-3.6225 \qquad (8)$$

with a correlation coefficient of $R^2=0.996$. In view of the goodness of fit, it is apparent that, in practice, double-valued $\rho_b$ determinations have been eliminated by the data processing method disclosed above. The iterative solution method, when applied separately to gas and liquid saturated formations with the same density, produces bulk density values $\rho_b$ that agree to within 1 percent for $\rho_b$ ranging from 1.86 g/cm$^3$ to 2.65 g/cm$^3$. The non-zero intercept obtained from the fit represented by equation (8) and shown in FIG. 4 is due to the fact that as formation density gets very small, approaching a void space, the borehole materials remain and thereby produce an effective upper limit on $L_{IG,l}$. This effect is illustrated by setting bulk density $\rho_b$=0.00 and solving equation (8) for the linearized inelastic scatter gamma ray diffusion length $L_{IG,l}$. The solution yields $L_{IG,l}$=20.15 cm, which is a value consistent with the relatively large inelastic scatter gamma ray diffusion length expected for the predominant borehole material, salt water.

The two-group diffusion analysis represented by equation (5) still produces an uncertainty in the magnitude of the converged $L_{IG,l}$ value but it does produce the desired unambiguous or "single-valued" inverse proportionality to formation bulk density. The proportionality constant can be determined by calibration of the response of the tool in formations with known lithology, porosity, density, fluid saturation and borehole conditions. This "physical model" calibration process can be supplemented with computer simulations of the tool's response. In the following discussions, it will be assumed that the tool has been calibrated and that the inverse of the converged $L_{IG,l}$ has been normalized so that it is proportional to formation bulk density $\rho_b$.

Figure 5:
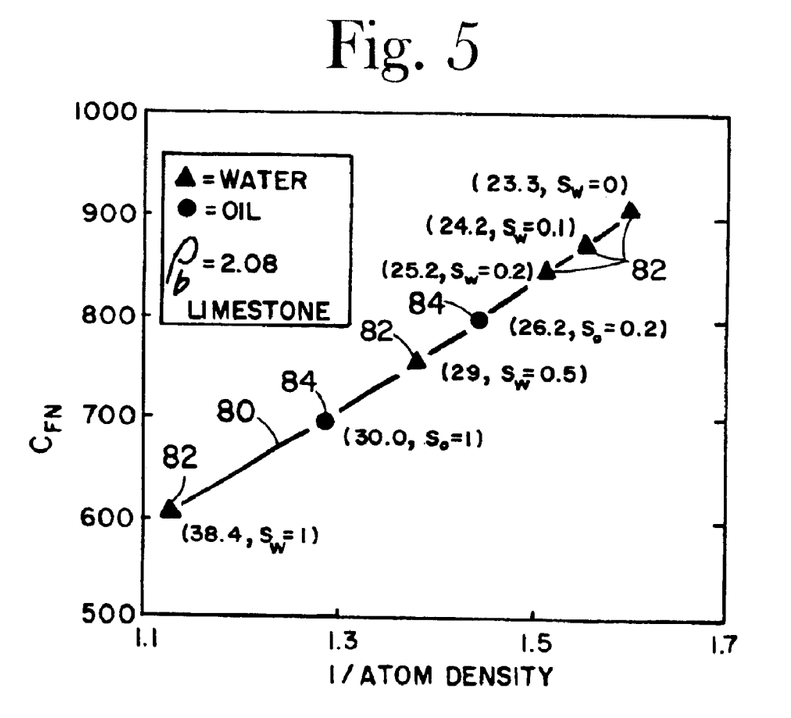
FIG. 5 illustrates measured fast neutron count rate plotted as a function of the inverse of atom density of formation material.

Once the bulk density $\rho_b$ is determined, formation porosity and fluid saturation (expressed as liquid saturation fraction $S_W$) can be inferred from a plot of $C_{FN}$ versus the reciprocal of atom density of the formations. FIG. 5 illustrates an example of such a plot, which was derived using Monte Carlo simulation for a limestone formation with a bulk density of 2.08 g/cm³. Data points 82 represent formations saturated with a combination of salt water (liquid density=1.07 gm/cm³) and gas (fluid density=0.00 gm/cm³). Data points 84 represent formations saturated with a combination of low density oil (liquid density=0.61 gm/cm³) and gas (fluid density=0.00 gm/cm³). Numbers within parenthesis by each data point represent formation porosity and liquid saturation fraction, respectively. $S_W$ and $S_O$ denote saturation fractions for the salt water and oil liquids, respectively. Curve 80 is fitted through all data points 82 and 84.

Still referring to FIG. 5, a series of similar curves would be needed for the full bulk density range and lithology expected from field data. As illustrated with the curve 80, note the near linear dependence of the fast neutron response $C_{FN}$ on the reciprocal of atom density. This property facilitates the interpolation of values from measured fast neutron response as will be illustrated in a subsequent section of this disclosure. Also note that different types of fluids, and mixtures of fluids such as oil and gas, also fall on the curve 80. This means that once bulk density $\rho_b$ has been determined as discussed above from the solution of equation (5), then a single curve 80 of the type shown in FIG. 5 along with a measure of $C_{FN}$ is sufficient to determine formation porosity and saturation for that bulk density, regardless of fluid type.

Figure 6:
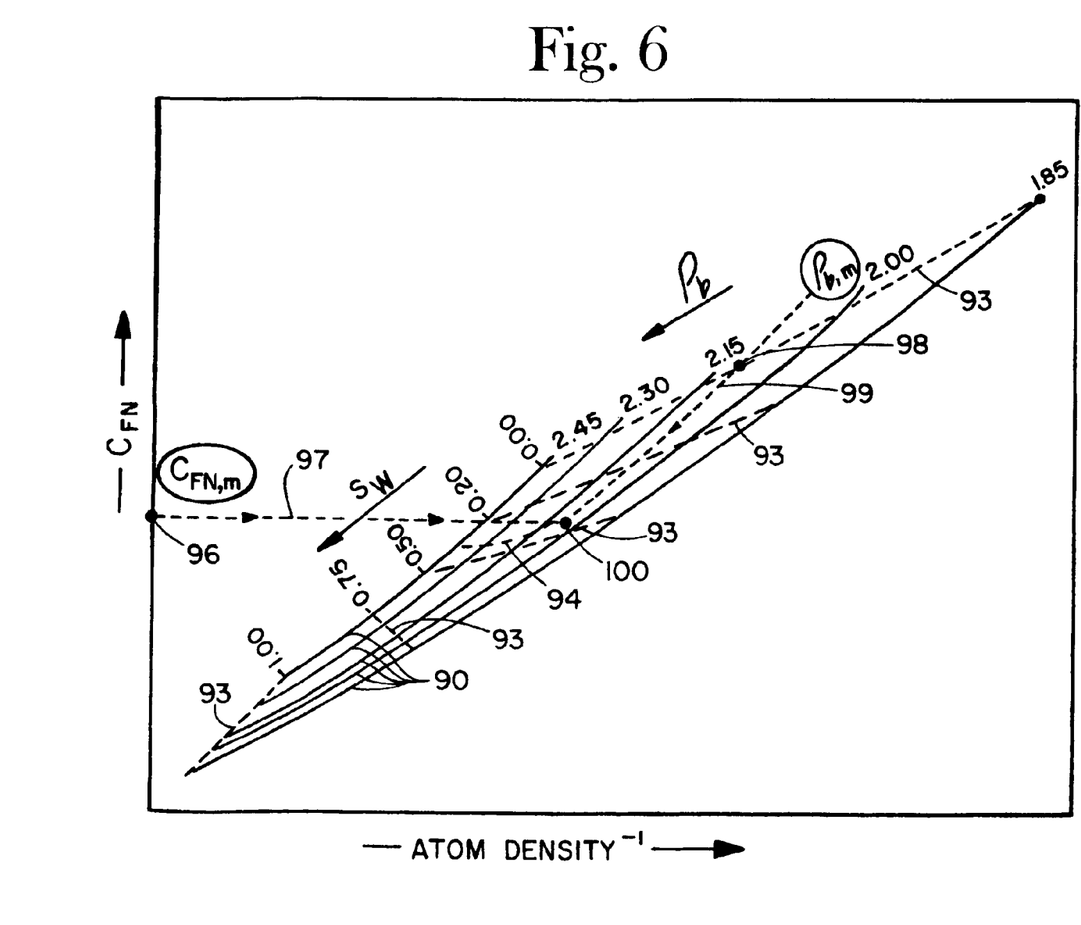
FIG. 6 shows a graphical solution for formation porosity and fluid saturation, expressed as fractional liquid saturation $S_W$, using a previously determined value of bulk density and measured fast neutron count rate.

FIG. 6 illustrates conceptually a graphical solution for fluid saturation, expressed as $S_W$, using a family of constant bulk density curves of the type shown in FIG. 5. The curves shown in FIG. 6 are for a specific formation lithology, such as sandstone or limestone. Curves 90 represent constant densities increasing in magnitude to the left as shown by the $\rho_b$ arrow. Constant liquid fluid saturations ($S_W$) are denoted by broken curves 93, and increase to the left over a range of $S_W$=0.00 to $S_W$=1.00. Assume that the measured fast neutron count rate is $C_{FN,m}$ and the accompanying bulk density determination is $\rho_{b,m}$. The subscript "m" simply denotes specific "measured" quantities used in this particular illustration. The previously determined value of $\rho_{b,m}$ is entered at 98 and projected along a constant bulk density as shown by the dotted curve 99. The measured fast neutron count rate $C_{FN,m}$ is entered at 96 and projected horizontally as illustrated by the dotted curve 97. Curves 97 and 99 intersect at the point 100. A broken curve 94 is then projected along a constant $S_W$ line thereby indicating formation liquid fluid saturation $S_W$ of about 0.40. Once a single-valued bulk density $\rho_b$ is unambiguously determined, single-valued fluid saturation $S_W$ can also be unambiguously determined using the analysis methods illustrated graphically in FIG. 6. A single-valued formation porosity can then be determined from $\rho_b$ and $S_W$ using the relationship $$\text{Porosity}=(\rho_{ma}-\rho_b)/(\rho_{ma}-(S_W\rho_{liq})) \tag{9}$$

where $\rho_{ma}$=the density of the formation matrix and $\rho_{liq}$=the density of the liquid saturating the pore space of the formation. It is assumed that $\rho_{ma}$ and $\rho_{liq}$ are known from other sources.

In the disclosure of analysis methods of the invention, graphical solutions such as the ones illustrated in FIGS. 4 and 6 have been used to illustrate basic principles. It should be understood that mathematical relationships have been developed for the various steps of the analysis methodology, and that parameters of interest are preferably computed using these mathematical relationships along with appropriate measured quantities. Computations are performed using a suitably programmed processor.

Figure 7:
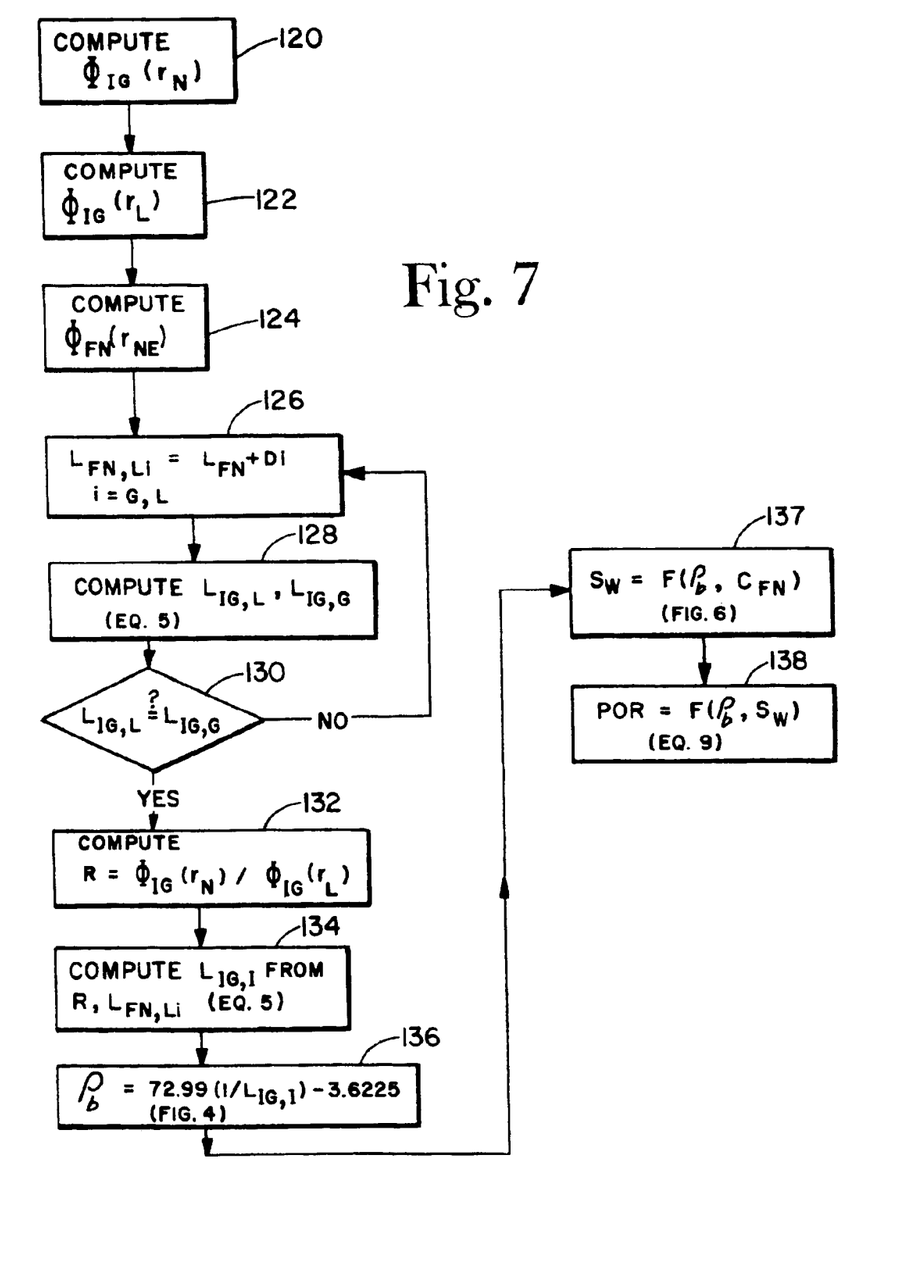
FIG. 7 is a flow chart showing steps in developing the iterative solution of the data analysis model.

The initial development of the tool response is summarized in the form of a flow chart in FIG. 7. Values of $\Phi_{IG}(r_N)$, $\Phi_{IG}(r_L)$, and $\Phi_{FN}(r_{NE})$ are computed at steps 120, 122 and 124, respectively, using simulation models and the two-group equations (1) and (2). Values of $L_{FN}$ are computed from numerical simulations. These values are incremented by $D_i$ at step 126 according to equation (6) to yield $L_{FN,Li}$. These values of $L_{FN,Li}$, along with $\Phi_{IG}(r_N)$ and $\Phi_{IG}(r_L)$, are used in equation (5) to compute $L_{IG,L}$ and $L_{IG,G}$ at step 128. Resulting values are compared at step 130, and $D_i$ is iteratively adjusted until $L_{IG,L}=L_{IG,G}$. The ratio $R=\Phi_{IG}(r_N)/\Phi_{IG}(r_L)=C_{G,N}/C_{G,L}$ is computed at step 132. A converged "intrinsic" value of inelastic gamma ray diffusion length $L_{IG,l}$ for the related $\rho_b$ value is computed at step 134 using R and $L_{FN,Li}$ in equation (5). The relationship between $\rho_b$ and $1/L_{IG,l}$ is determined at step 136. This step is shown graphically in FIG. 4 and expressed analytically in equation (8). This allows formation bulk density $\rho_b$ to be determined from measured parameters. An analytical expression relating formation fluid saturation to $\rho_b$ and $C_{FN}$ (see FIG. 6) is developed at step 137. An analytical expression relating formation porosity to $\rho_b$ and $S_W$ (see equation (9)) is developed at step 138.

7. Field Data Processing

In field applications of the system, measured quantities are:

$C_{FN}$=fast neutron count rate measured by a neutron detector at an axial spacing from the neutron source of $r_{NE}$;

$C_{IG,N}$=inelastic scatter gamma radiation count rate measured by a gamma ray detector at an axial spacing from the neutron source of $r_N$; and $C_{IG,L}$=inelastic scatter gamma radiation count rate measured by a gamma ray detector at an axial spacing from the neutron source of $r_L$.

Figure 8:
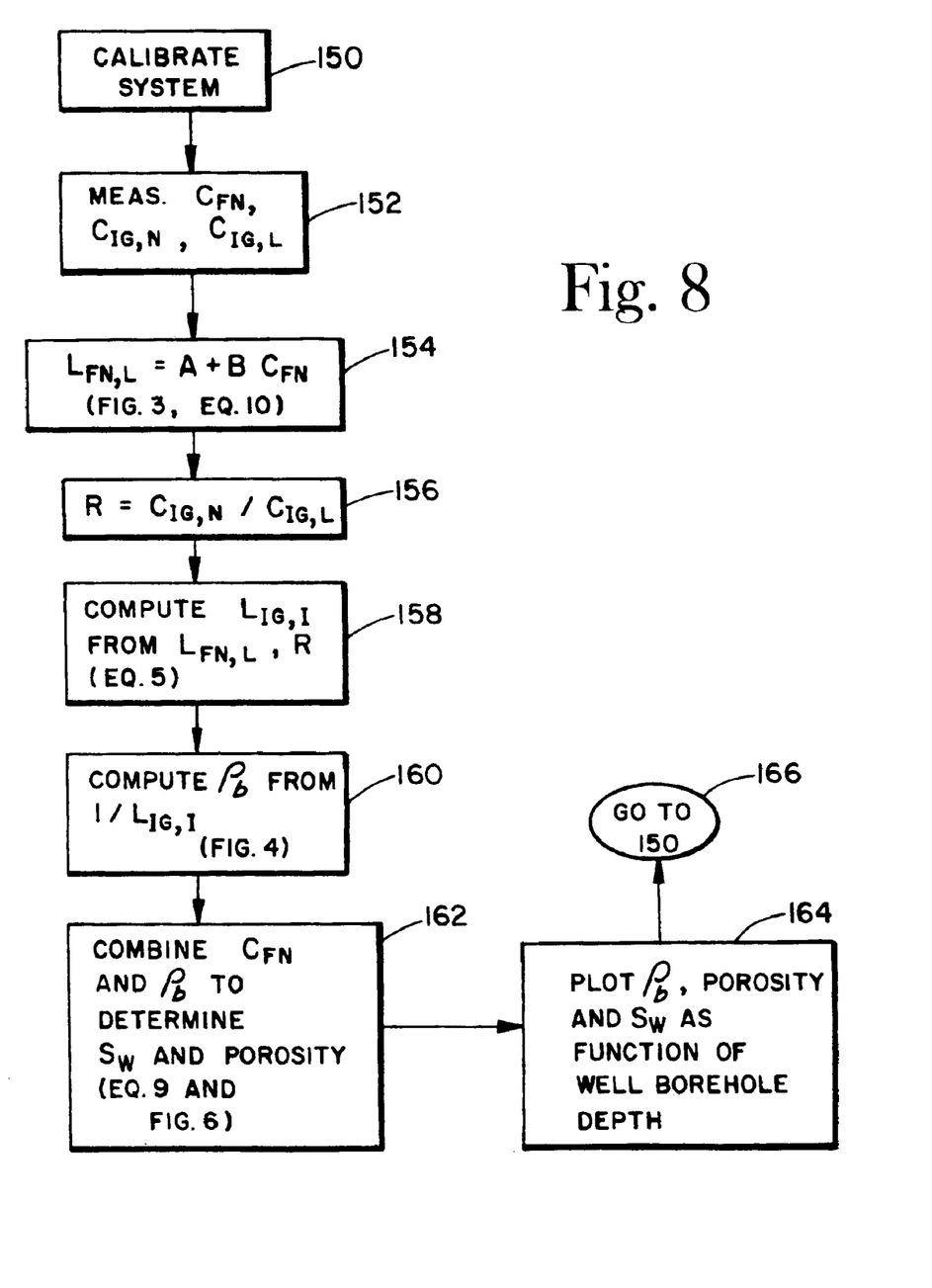
FIG. 8 is a flow chart showing steps in determining formation parameters of interest in a field logging system.

The data processing methodology for field application of the system is summarized in the flow chart of FIG. 8. The tool response is calibrated under known conditions as discussed previously. As an example, the measured fast neutron response $C_{FN}$ is converted to a $L_{FN,L}$ value using an equation of the form $$L_{FN,L}=A+(BC_{FN}) \tag{10}$$

which is the same form shown in equation (7) and graphically in FIG. 3. The subscript "i" has been omitted since a smooth "linearized" relation representing all $L_{FN,L}$ points has been established at this point, regardless of whether formation material is gas or liquid saturated. A and B are calibration constants. The calibration constants take into account detector efficiency, source strength, tool geometry and the like. The count rates $C_{FN}$, $C_{IG,N}$ and $C_{IG,L}$ are measured at step 152. The parameter $L_{NF,Li}$ is computed at step 154. The ratio R of measured count rates $C_{IG,N}/C_{IG,L}$ is computed at step 156. The iterated, intrinsic value of inelastic scatter gamma radiation diffusion length, $L_{IG,I}$, is computed at step 158. Formation bulk density is then determined at step 160 using the method illustrated graphically in FIG. 4. This value of formation bulk density and the measured fast neutron count rate are combined at step 162 to obtain formation porosity and fluid saturation. Step 162 is illustrated graphically in FIG. 6 for determining formation fluid saturation $S_W$, and is illustrated analytically in equation (9) for determining formation porosity. Finally, formation parameters of interest are recorded as a function of well depth at which they are determined at step 164, and the process is repeated at step 166 as the logging tool is conveyed along the borehole.

While the foregoing disclosure is directed toward the preferred embodiments of the invention, the scope of the invention is defined by the claims, which follow.

What is claimed is:

1. A method for determining at least one parameter of material, comprising the steps of:
   (a) irradiating said material with a radiation source that emits neutrons;
   (b) measuring with a single neutron detector neutron radiation at a first axial spacing from said radiation source;
   (c) measuring gamma radiation at a second axial spacing and at a third axial spacing from said radiation source;
   (d) from said measure of neutron radiation, obtaining a neutron diffusion length, and
   (e) combining said neutron diffusion length and said measures of gamma radiation in an iterative solution of at least a two-group radiation diffusion model to obtain self consistent values of said neutron diffusion length and a gamma ray diffusion length for said at least one parameter.

2. The method of claim 1 wherein:
   (a) said material is earth formation penetrated by a borehole; and
   (b) said source produces fast neutrons; and
   (c) a plurality of said parameters are determined.

3. The method of claim 2 wherein:
   (a) said neutron radiation is measured with a first type of radiation detector;
   (b) said gamma radiation is measured with a second type of radiation detector; and
   (c) said first and said second types of radiation detectors and said neutron source are disposed within a logging tool.

4. The method of claim 3 further comprising the step of conveying said logging tool within said borehole with a wireline.

5. The method of claim 3 further comprising the step of conveying said logging tool within said borehole with a drill string.

6. The method of claim 1 wherein said neutron radiation is fast neutron radiation and said gamma radiation is inelastic scatter gamma radiation.

7. The method of claim 1 wherein said third axial spacing is greater than said first axial spacing, and said first axial spacing is greater than said second axial spacing.

8. The method of claim 1 wherein said plurality of parameters comprise formation bulk density, formation porosity, and formation fluid saturation.

9. A method for determining a plurality of parameters of earth formation penetrated by a borehole, comprising the steps of:
   (a) irradiating said formation with fast neutrons produced by a fast neutron source that is sequentially pulsed;
   (b) during a sequential pulse, measuring, with a single neutron detector, fast neutron radiation at a first axial spacing from said source thereby obtaining a fast neutron diffusion length;
   (c) during said sequential pulse, measuring inelastic scatter gamma radiation at a second axial spacing and at a third axial spacing from said source;
   (d) iterating said fast neutron diffusion length in a numerical solution of a two-group radiation diffusion model to obtain a linearized relationship between said fast neutron diffusion length and said measure of fast neutron radiation, wherein said linearized relationship is independent of fluid saturation, fluid type and pore space volume of said formation; and
   (e) iteratively combining said fast neutron radiation measurement and an inelastic gamma ray diffusion length obtained from said inelastic scatter gamma ray measurements with said linearized relationship to converge upon a measure of bulk density of said formation.

10. The method of claim 9 comprising the additional step of combining said measure of bulk density with said fast neutron radiation measurement to obtain a measure of liquid saturation of said formation.

11. The method of claim 10 comprising the additional step of combining said measure of bulk density with said measure of liquid saturation to obtain a measure of porosity of said formation.

12. The method of claim 9 wherein said third axial spacing is greater than said first axial spacing, and said first axial spacing is greater than said second axial spacing.

13. The method of claim 9 wherein:
   (a) said fast neutron radiation is measured with a first type of radiation detector;
   (b) said inelastic scatter gamma radiation is measured with a second type of radiation detector; and
   (c) said first and said second types of radiation detectors and said neutron source are disposed within a logging tool.

14. The method of claim 13 further comprising the step of conveying said logging tool within said borehole with a wireline.

15. The method of claim 13 further comprising the step of conveying said logging tool within said borehole with a drill string.

16. A system for determining a plurality of parameters of earth formation penetrated by a borehole, comprising:
   (a) a logging tool comprising a pressure housing in which are disposed
      (i) a source of neutrons,
      (ii) a single neutron detector disposed at a first axial spacing from said source,
      (iii) a first gamma ray detector disposed at a second axial spacing from said source, and
      (iv) a second gamma ray detector disposed at a third axial spacing from said source; and
   (b) a processor which combines gamma radiation measured by said first and said second gamma ray detectors and neutron radiation measured by said neutron detector using an iterative numerical solution of a two-group radiation diffusion model converging upon self consistent values to obtain said plurality of parameters.

17. The system of claim 16 further comprising:

(a) a conveyance unit located at the surface of the earth; and (b) a conveyance member with a first end operationally connected to said logging tool and a second end operationally connected to said conveyance unit.

18. The system of claim 16 wherein:

(a) said neutron source is operated to emit sequential pulses of fast neutrons, (b) said neutron detector measures fast neutron radiation during a pulse of fast neutrons; and (c) said gamma ray detectors measure inelastic scatter gamma radiation during a pulse of fast neutrons.

19. The system of claim 18 wherein:

(a) said iterative solution linearizes a relationship between said measure of fast neutron radiation and a fast neutron diffusion length; and (b) said fast neutron radiation measurement and said inelastic scatter gamma ray measurements are combined with said linearized relationship to obtain a measure of bulk density of said formation.

20. The system of claim 16 wherein said third axial spacing is greater than said first axial spacing, and said first axial spacing is greater than said second axial spacing.

21. The system of claim 16 wherein said conveyance member comprises a wireline.

22. The system of claim 16 wherein said conveyance member comprises a drill string.

23. The system of claim 16 wherein said neutron detector measures fast neutron radiation during a pulse of fast neutrons and said gamma ray detectors measure inelastic scatter gamma radiation during the same pulse of fast neutrons.

24. A method for determining a parameter of material from a measure, with a single neutron detector, of neutron radiation at a first axial spacing from a neutron source and two measures of gamma radiation at a second axial spacing and at a third axial spacing from the source, said method comprising combining said measures of said neutron radiation and said gamma radiation in a convergent iterative solution of a two-group radiation diffusion model to obtain single-valued measure of said parameter.

25. A method for determining a plurality of parameters of earth formation from a measure of fast neutron radiation by a single neutron detector at a first axial spacing from a neutron source and two measures of inelastic scatter gamma radiation at a second axial spacing and at a third axial spacing from the source, said method comprising:

(a) iterating a numerical solution of a two-group radiation diffusion model to obtain a linearized relationship between a fast neutron diffusion length and said measure of fast neutron radiation, wherein said linearized relationship is independent of fluid saturation, fluid type and pore space volume of said formation; and (b) combining said fast neutron radiation measurement and said inelastic scatter gamma ray measurements with said linearized relationship to obtain a measure of bulk density of said formation.

26. A system for determining a plurality of parameters of earth formation with a logging tool which induces and measures neutron radiation and gamma radiation, said system comprising a processor which combines two axially spaced measures of said gamma radiation and a measure, with a single neutron detector, of said neutron radiation using a convergent iterative numerical solution of a two-group radiation diffusion model to obtain said plurality of parameters.

27. A method for determining at least one parameter of material, comprising the steps of:

(a) inducing radiation within said material with a source that emits neutrons;

(b) measuring induced neutron radiation with a single neutron detector at a first axial spacing from said source;

(c) measuring induced gamma radiation at a second axial spacing and at a third axial spacing from said source; and (e) combining said measure of neutron radiation and said measures of gamma radiation in an iterative solution of at least a two-group radiation diffusion model to obtain said at least one parameter.

28. The method of claim 27 wherein:

(a) said material is earth formation penetrated by a borehole; and (b) said source produces fast neutrons; and (c) a plurality of said parameters are determined.

29. The method of claim 27 wherein said induced neutron radiation is fast neutron radiation and said induced gamma radiation is inelastic scatter gamma radiation.

30. The method of claim 27 wherein said third axial spacing is greater than said first axial spacing, and said first axial spacing is greater than said second axial spacing.

31. A method for determining a plurality of parameters of earth formation penetrated by a borehole, comprising the steps of:

(a) irradiating said formation with fast neutrons produced by a fast neutron source that is sequentially pulsed;

(b) during a sequential pulse, measuring, with a single neutron detector, fast neutron radiation at a first axial spacing from said source thereby obtaining a fast neutron measurement;

(c) during said sequential pulse, measuring inelastic scatter gamma radiation at a second axial spacing and at a third axial spacing from said source;

(d) combining said measure of fast neutron radiation and said measures of inelastic gamma radiation using an iterative solution of a two-group radiation diffusion model to obtain a linearized relationship between a fast neutron diffusion length and said measure of fast neutron radiation, wherein said linearized relationship is independent of fluid saturation, fluid type and pore space volume of said formation; and (e) iteratively combining said fast neutron radiation measurement and an inelastic gamma ray diffusion length obtained from said inelastic scatter gamma ray measurements with said linearized relationship to converge upon a measure of bulk density of said formation.

32. The method of claim 31 comprising the additional step of combining said measure of bulk density with said fast neutron radiation measurement to obtain a measure of liquid saturation of said formation.

33. The method of claim 32 comprising the additional step of combining said measure of bulk density with said measure of liquid saturation to obtain a measure of porosity of said formation.

34. The method of claim 31 wherein said third axial spacing is greater than said first axial spacing, and said first axial spacing is greater than said second axial spacing.

* * * * *